US012736405B2

(12) United States Patent
Bayer et al.

(10) Patent No.: US 12,736,405 B2
(45) Date of Patent: Sep. 15, 2026

(54) MONITORING PROCEDURE FOR QUALITY MONITORING OF MEASUREMENT SPECTRA

(71) Applicant: Endress+Hauser Conducta GmbH+Co. KG, Gerlingen (DE)

(72) Inventors: Andreas Bayer, Gerlingen (DE); Thilo Krätschmer, Gerlingen (DE); Felicia Seichter, Ludwigsburg (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 211 days.

(21) Appl. No.: 18/512,650

(22) Filed: Nov. 17, 2023

(65) Prior Publication Data

US 2024/0167878 A1 May 23, 2024

(30) Foreign Application Priority Data

Nov. 17, 2022 (DE) ..................... 10 2022 130 510.4

(51) Int. Cl.
*G01J 3/46* (2006.01)
*G01J 3/02* (2006.01)
*G01J 3/42* (2006.01)

(52) U.S. Cl.
CPC ............... *G01J 3/46* (2013.01); *G01J 3/0264* (2013.01); *G01J 3/42* (2013.01); *G01J 2003/467* (2013.01)

(58) Field of Classification Search
CPC .... G01J 3/46; G01J 3/0264; G01J 3/42; G01J 2003/467; G01J 3/28; G01N 21/17; G01N 2201/127
See application file for complete search history.

(56) References Cited

U.S. PATENT DOCUMENTS 6,820,013 B1 * 11/2004 Frickel .................. G01N 21/31 702/30
2019/0145888 A1 * 5/2019 Mannhardt ........ G01N 21/8507 356/326
2023/0194415 A1 * 6/2023 Reimann ................ G06F 17/16 250/252.1

FOREIGN PATENT DOCUMENTS

DE 69129751 T2 2/1999
DE 69328331 T2 11/2000

(Continued)

OTHER PUBLICATIONS

DE_102019116957_a1-_translation (Year: 2020).*

*Primary Examiner* — Kara E. Geisel
*Assistant Examiner* — Carlos Perez-Guzman
(74) *Attorney, Agent, or Firm* — Kelly J. Smith; Endress+Hauser Conducta GmbH+Co. KG

(57) ABSTRACT

A monitoring procedure for monitoring the quality of measurement spectra of a liquid medium continuously determined with a spectrometric sensor, which spectra in each case reproduce spectral values in a specified measurement wavelength range, is described with which: for each measurement spectrum, a quality parameter of the respective measurement spectrum is determined in each case based upon at least one characteristic value calculated in each case based upon the spectral values of the respective measurement spectrum, wherein each characteristic value for each measurement spectrum is determined in each case based upon the spectral values of the respective measurement spectrum in a range, specified for the respective characteristic value, of the measurement wavelength range, and, based upon the quality parameters, those measurement spectra which have spectral values that are impaired by a disturbance are identified as outliers.

13 Claims, 4 Drawing Sheets

(56) References Cited

FOREIGN PATENT DOCUMENTS

| | | | | | |
|---|---|---|---|---|---|
| DE | 19963561 | A1 | | 7/2001 | |
| DE | 102019116957 | A1 | * | 12/2020 | ............. G01N 33/18 |
| WO | WO-2020216938 | A1 | * | 10/2020 | ............ G01J 3/2823 |

* cited by examiner

A(tj)

Kn; Δλn

Q(tj):= f(Kn)

V1

A(tj)=AS?

V2

U

V3

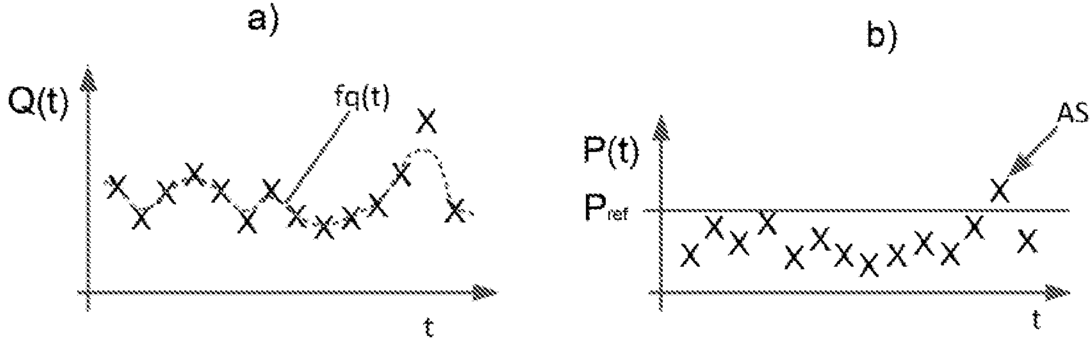
Fig. 6
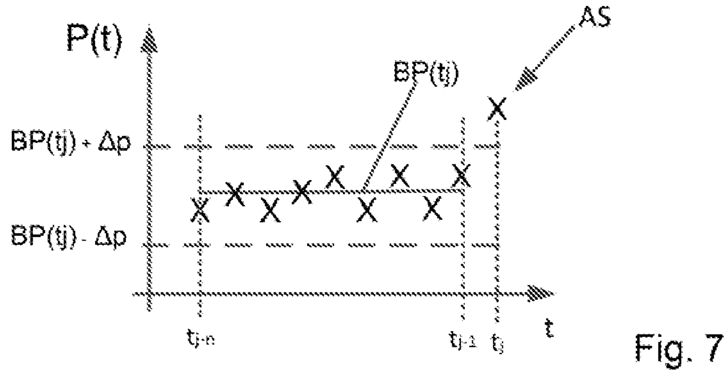
Fig. 7
Fig. 8

MONITORING PROCEDURE FOR QUALITY MONITORING OF MEASUREMENT SPECTRA

CROSS-REFERENCE TO RELATED APPLICATION

The present application is related to and claims the priority benefit of German Patent Application No. 10 2022 130 510.4, filed on Nov. 17, 2022, the entire contents of which are incorporated herein by reference.

TECHNICAL FIELD

The present disclosure relates to a monitoring procedure for monitoring the quality of measurement spectra of liquid media determined with a spectrometric sensor, a measuring procedure comprising the monitoring procedure for measuring a measured variable of a medium, and a measuring device that is designed to carry out the measuring procedure.

BACKGROUND

Spectrometric sensors are used in a variety of different types of applications, e.g., in wastewater treatment plants, in laundries, and in plants conducting drinking water, to measure different measured variables. Measured variables such as a concentration of an analyte contained in the medium, such as a nitrite content and/or a nitrate content of the medium, a chemical or biological oxygen requirement of the medium, and/or turbidity of a medium may be determined based upon measurement spectra determined with spectrometric sensors.

Spectrometric sensors comprise a spectrometric unit that, during measurement operation, receives measurement radiation resulting from an interaction with the medium, such as transmission, reflection, or scattering, and uses the measurement radiation to determine measurement spectra, which in each case reproduce spectral values of the measurement radiation in a specified measurement wavelength range. Some spectrometric sensors additionally comprise an evaluation device that uses the measurement spectra to determine measured values of at least one measured variable. Alternatively, the measured values may be determined by means of a device connected to the spectrometric sensor, such as a measuring transducer or a transmitter. Depending upon the measured variable, the associated measured values are determined, for example, based upon a total integral intensity measured over the entire measurement wavelength range or based upon spectral intensities measured at one or more specific wavelengths. A further embodiment consists in determining in advance a dependence, characteristic of the measured variable, of the spectral distribution of the measurement spectra upon the measured value of the measured variable, and deriving from this a calculation rule by means of which the measured value of the measured variable is calculated on the basis of measurement spectra recorded in the subsequent measurement operation. This calculation rule is determined, for example, in the form of a mathematical and/or statistical model, such as a model referred to in the art as a chemometric model.

In a large number of applications, there is the problem that disturbances occurring at the point of use may briefly impair the quality of the measurement spectra. Such disturbances can be caused, for example, by air or gas bubbles occurring in the medium. Air or gas bubbles can occur, for example, if compressed air cleaning is carried out at or near the sensor. In addition, they can also be caused by turbulent flows of a medium flowing past the sensor. The occurrence of air or gas bubbles usually has an immediate effect on the measurement spectra. This in turn results in a corresponding falsification of the measured values determined based upon the measurement spectra. Accordingly, depending upon the nature of the disturbance, such as the size, number, direction of motion, speed of motion, and/or spectral characteristics of the bubbles, the measured values can have significant measurement errors. Similarly, any impurities that may occur in the medium, such as particles or suspended matter, can impair the quality of the measurement spectra and lead to correspondingly erroneous measured values. Erroneous measured values are particularly problematic if the measured values are used to monitor, control, and/or regulate a property of the medium, a plant, and/or a process, such as a manufacturing process.

Conventional measured value filters, such as moving median filters or smoothing algorithms, are usually not able to filter out measured values that have been made false due to disturbances, or only to a very limited extent. In addition, it is typically difficult or even impossible to recognize as outliers any corrupted measured values contained in the measured values. The main problem here is that it is not readily possible, based upon the measured values, to distinguish changes in measured values caused by disturbances from changes in measured values caused by changes in the measured variable.

The measurement spectra recorded by spectrometric sensors contain much more information than the measured values. Thus, experts with sufficient experience may be able to recognize disturbances based upon the measurement spectra. However, the information required for this is complex and cannot be obtained from the measured values determined based upon the measurement spectra. Even if it were possible to develop an expert system capable of recognizing measurement spectra impaired by disturbances, the development of such a system would be costly. Methods that can be used for this purpose, such as procedures for the classification of measurement spectra that can be developed under certain circumstances by means of neural networks or artificial intelligence, typically require the creation of a model suitable for carrying out the classification. Such models must be determined based upon training data and subsequently validated. However, measurement spectra recorded with identical spectrometric sensors in different applications usually differ from application to application. Accordingly, a model created for a particular application would not be readily usable in other applications. In addition, a correspondingly complex expert system would require a lot of computing power, as well as possibly a lot of memory space, which is typically not available to a sufficient extent in simple spectrometric sensors.

SUMMARY

It is an object of the present disclosure to specify a monitoring procedure for monitoring the quality of measurement spectra determined with a spectrometric sensor, with which measurement spectra impaired by disturbances that may occur at the point of use can be identified as outliers in a simple and efficient manner.

For this purpose, the present disclosure comprises a monitoring procedure for monitoring the quality of measurement spectra of a liquid medium continuously determined by a spectrometric sensor, which spectra in each case reproduce spectral values of a measurement radiation, received by the spectrometric sensor and resulting from an interaction with the medium, in a specified measurement wavelength range, with which:

for each measurement spectrum, a quality parameter of the respective measurement spectrum is determined in each case based upon at least one characteristic value calculated in each case based upon the spectral values of the respective measurement spectrum, wherein each characteristic value for each measurement spectrum is determined in each case as an integral, as a sum, as a weighted sum, or as a weighted or unweighted sum of powers of the spectral values, related to a specified reference, of the respective measurement spectrum in a range, specified for the respective characteristic value, of the measurement wavelength range, based upon the quality parameters of the measurement spectra, those measurement spectra which have impaired spectral values due to a disturbance impairing the quality parameter that occurred during their determination are identified as outliers, and a monitoring result is determined and made available based upon the measurement spectra identified as outliers.

The monitoring procedure offers the advantage that the characteristic values and thus also the quality parameter of the individual measurement spectra can be determined numerically with very little computational effort, and little computational power and memory is required for their calculation. The characteristic values offer the advantage that the profile of the spectral values of the measurement spectra in the associated range of the measurement wavelength range is summarily recorded for each characteristic value. Correspondingly, the quality parameters of measurement spectra determined successively in time based upon the characteristic values change when disturbances occur, as a function of the effects of the disturbances in the respective range of the measurement wavelength range summarily recorded via the characteristic values. This offers the advantage that measurement spectra impaired by disturbances can be reliably identified based upon the quality parameters without the need for a complex classification procedure.

A first further development consists in:

the quality parameters of the measurement spectra being determined as a single characteristic value or based upon a single characteristic value, the range assigned to the single characteristic value being either a subrange of the measurement wavelength range or being equal to the measurement wavelength range, and the reference being a reference spectrum whose spectral values have a profile characteristic of measurement spectra determined in the absence of disturbances.

A second further development consists in:

the characteristic values comprising a first characteristic value and a second characteristic value, wherein the range specified for the first characteristic value is a first subrange of the measurement wavelength range, and the range specified for the second characteristic value is a second subrange of the measurement wavelength range different from the first subrange, the quality parameters of the measurement spectra being determined in each case based upon a difference of the two characteristic values of the respective measurement spectrum or in each case based upon a difference, normalized to a sum of the two characteristic values, of the two characteristic values of the respective measurement spectrum, and the reference being either a constant reference value identical for all wavelengths or a reference value of zero.

Embodiments of the second further development consist in:

the range, specified for the first characteristic value, comprising wavelengths in an ultraviolet range and the range, specified for the second characteristic value, comprising wavelengths in a visual range of the measurement wavelength range, and/or the range specified for the first characteristic value and the range specified for the second characteristic value being determined in that:

a) they are defined on the basis of a visual comparison of measurement spectra recorded during disturbance-free operation and measurement spectra recorded when disturbances occur, in such a manner that the areas enclosed in the two ranges under the measurement spectra change in different manners due to disturbances, or b) based upon training data comprising measurement spectra recorded during disturbance-free operation and measurement spectra recorded when disturbances occur, those ranges for which the differences between the quality parameters of the measurement spectra recorded when disturbances occur and the quality parameters of the measurement spectra recorded during disturbance-free operation are as large as possible, larger than a specified threshold value, or even maximum, are numerically determined and subsequently used.

A third further development consists in the characteristic value or at least one of the characteristic values in each case:

being determined as a weighted sum or as a weighted or unweighted sum of powers of the spectral values, related to the specified reference, of the respective measurement spectrum, and weighting factors and/or exponents, corresponding to the powers, used for calculating the respective characteristic value being determined in that, based upon the training data comprising measurement spectra recorded during disturbance-free operation and measurement spectra recorded when disturbances occur, those weighting factors and/or exponents for which the differences between the quality parameters of the measurement spectra recorded when disturbances occur and the quality parameters of the measurement spectra recorded during disturbance-free operation are as large as possible, larger than a specified threshold value, or even maximum, are determined and subsequently used.

Additional further developments consist in:

a) those measurement spectra whose quality parameter deviates from a specified target value by more than the specified tolerance being identified as outliers, or b) the identification of the outliers being carried out based upon the quality parameters of the measurement spectra, taking into account a temporal development of the quality parameter of the measurement spectra recorded successively in time, or c) those measurement spectra whose quality parameter deviates by more than a specified tolerance from a reference value determined based upon a specified number of measurement spectra determined prior to the respective measurement spectrum, in particular, their average or median, being identified as outliers.

A fourth further development consists in:

the quality parameters of the measurement spectra determined successively in time being filtered by means of a filter, a smoothing filter, a moving average filter, a moving median filter, or an exponential filter, based upon the quality parameters and the associated filtered quality parameters, for each measurement spectrum, a deviation value being determined, which corresponds to an amount of a difference between the quality parameter of the respective measurement spectrum and the associated filtered quality parameter, and the identification of the outliers taking place based upon the deviation values in that:

a) those measurement spectra whose deviation value exceeds a specified threshold value are identified as outliers in each case, or b) the identification of the outliers is carried out based upon the deviation values, taking into account a temporal development of the deviation values of the measurement spectra recorded successively in time, or c) those measurement spectra whose deviation value deviates by more than a specified tolerance from a reference value, in particular, their average or median, determined based upon the deviation values of a specified number of measurement spectra determined prior to the respective measurement spectrum, are identified as outliers, or d) the deviation values of the successively recorded measurement spectra are filtered by means of a filter, a smoothing filter, a moving average filter, a moving median filter, or an exponential filter, and those measurement spectra whose deviation value deviates from the associated filtered deviation value by more than a specified tolerance are identified as outliers.

A fifth further development consists in an unusual condition, in particular, an unusual condition occurring at the point of use of the spectrometric sensor, which causes the spectral values of the measurement spectra to deviate from a profile characteristic of the respective application, being detected, and a status message, a message, a warning, or an alarm being output, displayed, and/or made available if more than a specified number of measurement spectra determined within a moving time window of specified duration have been identified as outliers.

A sixth further development consists in monitoring whether the medium is of a particular color in that:

for at least one of the measurement spectra, for measurement spectra determined successively at time intervals, or for each measurement spectrum, a color value of the medium is determined based upon the sum or the integral of the spectral values of the respective measurement spectrum over a spectral range, corresponding to the color, of the measurement wavelength range, and the color value and/or information determined based upon the color value about whether the medium has the color is output, displayed, and/or made available.

A seventh further development consists in monitoring, for at least one specified spectral range of the measurement wavelength range, whether optical saturation of the spectrometric sensor has occurred in the respective spectral range in that, for at least one of the measurement spectra, for measurement spectra determined successively at time intervals, or for each measurement spectrum, a check is made in each case as to whether optical saturation has occurred in the respective spectral range, wherein the procedure in particular is such that the occurrence of optical saturation:

in conjunction with measurement spectra formed as intensity spectra, is ascertained if at least one or the smallest of the spectral values of the respective measurement spectrum lying in the spectral range falls below a lower, constant, or wavelength-dependent limit value, and, in conjunction with measurement spectra formed as absorption spectra, is ascertained if at least one or the largest of the spectral values of the respective measurement spectrum lying in the spectral range exceeds an upper, constant, or wavelength-dependent limit value, and a saturation message, a warning, or an alarm is displayed, output, and/or made available if it has been ascertained that optical saturation has occurred in the respective spectral range.

One embodiment consists in:

a) a message, warning, or alarm being output, displayed, and/or made available if any of the measurement spectra have been identified as outliers, b) information about each measurement spectrum identified as an outlier being output, displayed, and/or made available, and/or c) for each measurement spectrum, information being output, displayed, and/or made available as to whether or not the respective measurement spectrum has been identified as an outlier.

Furthermore, the present disclosure comprises a measuring procedure comprising the monitoring procedure according to the present disclosure for measuring at least one measured variable of a liquid medium, with which measurement spectra of the medium are continuously determined by means of the spectrometric sensor, the monitoring procedure is carried out based upon the measurement spectra, measured values of the respective measured variable are determined based upon the measurement spectra, and a measurement and monitoring result is determined based upon the measured values, and the monitoring result and is output, displayed, and/or made available.

A further development of the measuring procedure consists in:

the measurement and monitoring result:

a) comprising measured values of the measured variable, b) comprising measured values of the measured variable and the monitoring result, and/or c) comprising measured values of the measured variable and at least one component of the monitoring result, unusual conditions detected by means of the monitoring procedure, the color value of the medium, the information, determined based upon the color value, about whether or not the medium has the color, and/or optical saturations detected by means of the monitoring procedure in at least one spectral range, and/or the measured values:

a) being determined independently of the monitoring result and the measurement and monitoring result for each measured value in each case containing information about whether the measured value was determined based upon a measurement spectrum identified as an outlier, or b) being determined in that:

b1) measurement spectra identified as outliers based upon the monitoring result are discarded, and the measured values are determined based upon the measurement spectra remaining after the discarding of the outliers and are output, displayed, and/or made available, or b2) the associated measured values are determined based upon each measurement spectrum, those measured values which were determined based upon the measurement spectra identified as outliers are discarded, and the measured values remaining after discarding such measured values are output, displayed, and/or made available.

Furthermore, the present disclosure comprises a measuring device for carrying out the measuring procedure, which:

is designed as a spectrometric sensor or comprises the spectrometric sensor, wherein the spectrometric sensor comprises a spectrometric unit that is designed to receive measurement radiation resulting from the interaction with the medium and to continuously determine and make available measurement spectra based upon the received measurement radiation, comprises a monitoring device which is connected to the spectrometric unit and is designed to carry out the monitoring procedure according to the present disclosure based upon the measurement spectra, comprises an evaluation device which is connected to the spectrometric unit and/or the monitoring device and is designed to determine measured values of the respective measured variable based upon the measurement spectra, and comprises an output device, which is designed to output, display, and/or make available the measurement and monitoring result.

A further development of the measuring device consists in the output device:

comprising an interface and/or a display device via which, for each measured value determined without taking into account the monitoring result, information is output, displayed, and/or made available in each case as to whether the respective measured value was determined based upon a measurement spectrum identified as an outlier, comprising at least one interface and/or one display device, via which in each case at least one component of the measurement and monitoring result, in particular the measured values and/or at least one component of the monitoring result, is output, displayed, and/or made available, and/or comprising a display device that:

comprises a display for displaying the measured values, has a display element or a display element designed as a light-emitting diode, which displays or lights up if a measurement spectrum has been identified as an outlier, has a display element designed as a color-coded display element, whose color displays whether or not the current measured value was determined based upon a measurement spectrum identified as an outlier, comprises at least one display element or a display element designed as a light-emitting diode for displaying optical saturations ascertained by means of the monitoring procedure, comprises a display element or a display element designed as a light-emitting diode for displaying unusual conditions detected by means of the monitoring procedure, and/or comprises a display element that displays the color value determined by means of the monitoring procedure and/or the information, determined based upon the color value, about whether or not the medium has the color.

Furthermore, the present disclosure comprises a computer program for monitoring the quality of measurement spectra of a liquid medium continuously determined by a spectrometric sensor, which spectra in each case reproduce spectral values of a measurement radiation, received by the spectrometric sensor and resulting from an interaction with the medium, in a specified measurement wavelength range, which comprises computer-readable program code elements, which, if executed on a computer, cause the computer to execute the monitoring procedure according to the present disclosure based upon the measurement spectra determined by the spectrometric sensor, and also a computer program product comprising such a computer program and at least one computer-readable medium on which at least the computer program is stored.

BRIEF DESCRIPTION OF THE DRAWINGS

The present disclosure and its advantages will now be explained in detail using the figures in the drawing, which show several exemplary embodiments. The same elements are indicated by the same reference numbers in the figures.

FIGS. 4 through 8 each show an exemplary embodiment for identifying outliers.

DETAILED DESCRIPTION

The present disclosure comprises a monitoring procedure for monitoring the quality of measurement spectra A(tj) of a liquid medium continuously determined with a spectrometric sensor, which spectra in each case reproduce spectral values a(λi) of a measurement radiation S, received by the spectrometric sensor and resulting from an interaction with the medium, in a specified measurement wavelength range Δλges.

The monitoring procedure can be used in a variety of different applications in which spectrometric sensors are used to determine measurement spectra A(tj) of liquid media. Examples include applications such as breweries, water monitoring systems, wastewater treatment plants, such as municipal sewage treatment plants or industrial wastewater treatment plants used in certain industries, laundries, or plants conducting drinking water.

The monitoring procedure can be used in conjunction with a variety of different spectrometric sensors, which comprise at least one spectrometric unit that receives the measurement radiation S, and determines and makes available the measurement spectra A(tj) based upon the measurement radiation S received. These include spectrometric sensors known from the prior art, such as the sensors described in the introduction for measuring a measured variable of a medium, such as a concentration of an analyte contained in the medium, such as a nitrite content and/or a nitrate content, a chemical oxygen requirement, a biological oxygen requirement, and/or a turbidity of the medium.

Figures 1, 2:
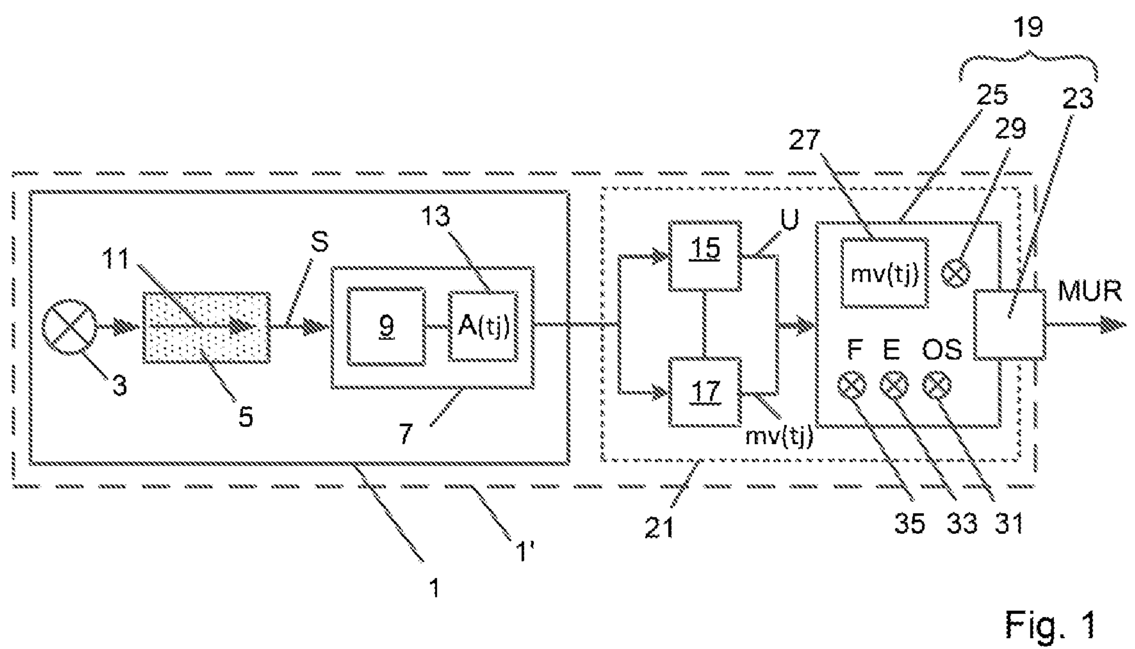
FIG. 1 shows a measuring device with a spectrometric sensor.
FIG. 2 shows a flowchart of a monitoring procedure.

FIG. 1 shows an example of a measuring device for measuring a measured variable, which comprises a spectrometric sensor 1 operating in transmission in the example shown. The spectrometric sensor 1 shown comprises a radiation source 3, which radiates radiation through a medium 5 during measurement operation, and a spectrometric unit 7, which receives measurement radiation S emerging from the medium 5. In this, an interaction of the radiation with the medium 5 takes place along an optical path 11 passing through the medium 5 here, with which a part of the radiation transmitted from the radiation source 3 to the spectrometric unit 7, which is dependent upon the wavelength-dependent absorption properties of the medium 5, is absorbed. The spectrometric unit 7 shown here as an example comprises a detector 9 that receives the measurement radiation S and a measurement electronics unit 13 connected to the detector 9, which determine the measurement spectra A(tj) based upon the radiation intensities of the measurement radiation S recorded metrologically by the detector 9 at different wavelengths λi. The measurement spectra A(tj) may be determined, for example, as intensity spectra made available by the measurement electronics unit 13, for example, in the form of raw digital or analog spectrometric signals, which comprise pairs of values of spectral values corresponding to the intensity Igem(λi), measured at the respective wavelength λi, and the associated wavelength Ai. Alternatively, the measurement electronics unit 13 is designed to determine the measurement spectra A(tj) as absorption spectra. In this case, the spectral values a(λi) of the measurement spectra A(tj), which occur at a specific wavelength λi and are formed as absorption values, are determined in each case in accordance with: a(λi):=−Log [Igem(λi)/I0(λi)] as the logarithm of the ratio of the radiation intensity I0(λi) entering the medium 5 at such wavelength λi to the intensity Igem(λi) of the measurement radiation S impinging on the detector 9 measured by the detector 9 at such wavelength λi.

The present disclosure is not limited to sensors operating in transmission, but can also be used analogously in conjunction with spectrometric sensors that use another form of interaction with the medium, such as reflection or scattering. Likewise, it can also be used in conjunction with spectrometric sensors without their own radiation source, which receive measurement radiation S along a received signal path, and determine and make available the associated measurement spectra A(tj), which in this case are also formed, for example, as intensity or absorption spectra.

The monitoring procedure shown in a flowchart in FIG. 2 can be divided into three procedure steps V1, V2, V3 described in detail below. In the first procedure step V1, a quality parameter Q(tj) is determined for each measurement spectrum A(tj). In the second procedure step V2, based upon the quality parameters Q(tj) of the measurement spectra A(tj), those measurement spectra A(tj) which have impaired spectral values a(λi) due to a disturbance that occurred during their determination and that impairs the quality parameter Q(tj) are identified as outliers AS. In the third procedure step V3, a monitoring result (U) is determined and made available based upon the measurement spectra A(tj) identified as outliers AS.

Figure 3:
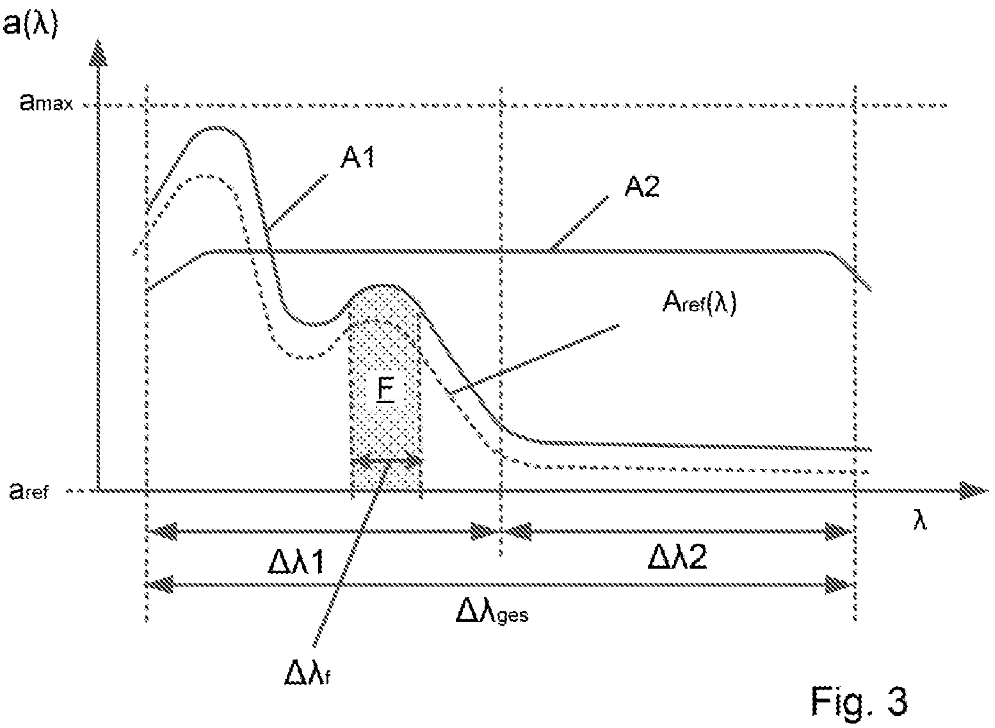
FIG. 3 shows a measurement spectrum determined during disturbance-free measurement operation and a measurement spectrum determined in the presence of a disturbance.

While, during disturbance-free measurement operation at successive times tj, specific measurement spectra A(tj) determined successively in time usually differ only slightly from one another, and their spectral values a(λi) have a profile characteristic of the respective application, any disturbances occurring during measurement operation, such as air bubbles, typically lead to considerable deviations of the spectral values a(λi) from the profile characteristic of the application. As an example, FIG. 3 shows two measurement spectra A1, A2, each determined by means of the spectrometric sensor 1 shown in FIG. 1. The first measurement spectrum A1 is an absorption spectrum of the medium 5, e.g., of wastewater, determined during disturbance-free measurement operation, which has the profile characteristic of the application. In FIG. 3, the characteristic profile shown as an example has two pronounced maxima in a range Δλ1 formed by a first subrange of the measurement wavelength range Δλges, whereas the spectral values a(λi) in a subsequent range Δλ2 formed by a second subrange of the measurement wavelength range Δλges are at a significantly lower, approximately constant, level. In the example shown, the first range Δλ1 comprises wavelengths in the ultraviolet range. The adjacent second range Δλ2 comprises wavelengths in the visual range. The second measurement spectrum A2 is an absorption spectrum determined in the same application with the same spectrometric sensor 1 in the presence of a disturbance formed by air bubbles. Air bubbles in medium 5 usually cause increased absorption in the entire measurement wavelength range Δλges. In the example shown, this results in the spectral values a(λi) of the second measurement spectrum A2 being at least approximately constant both in the first range Δλ1 and in the second range Δλ2 of the measurement wavelength range Δλges, and thus deviating significantly from the profile characteristic of the application.

Similarly, other disturbances, such as particles, suspended matter, and/or other impurities entering the optical path 11 of the spectrometric sensor 1 for a short time, also lead to changes in the measurement spectra A(tj), which impair the spectral values a(λi) in one or more subranges of the measurement wavelength range Δλges, or even in the entire measurement wavelength range Δλges.

Thus, each disturbance leads to significant changes in the spectral values a(λi) of the measurement spectra A(tj), which impair the profile of the spectral values a(λi) in individual ranges of the measurement wavelength range Δλges in a summarily recordable manner in each case. Accordingly, the first procedure step V1 proceeds in such a manner that the quality parameters Q(tj) of the measurement spectra A(tj) are determined based upon at least one characteristic value Kn calculated on the basis of the spectral values a(λi) of the respective measurement spectrum A(tj). The or each characteristic value Kn is determined in each case as an integral, as a sum, as a weighted sum, or as a weighted or unweighted sum of powers of the spectral values a(λi), related to a specified reference Aref, of the respective measurement spectrum A(tj) in a range Δλn, specified for the respective characteristic value Kn, of the measurement wavelength range Δλges. This form of calculating the characteristic values Kn offers the advantage that the profile of the spectral values a(λi) of the measurement spectra A(tj) related to the reference Aref is summarily recorded for each characteristic value Kn in the range Δλn, specified for the respective characteristic value Kn, of the measurement wavelength range Δλges. This makes it possible to determine the quality parameter Q(tj) of the measurement spectra A(tj) based upon the characteristic values Kn in such a manner that disturbances occurring during measurement operation lead to measurable changes in the values of the quality parameters Q(tj) of the measurement spectra A(tj) that are genuinely greater than fluctuations in the quality parameters Q(tj) caused by changes in the measured variable(s) during disturbance-free measurement operation. For this purpose, the quality parameters Q(tj) are calculated, for example, according to Q(tj):=f(Kn) as a function of the or each characteristic value Kn. Different designs can be used both with regard to the number of characteristic values Kn and with regard to the selection of the ranges Δλn, specified for the characteristic values Kn, of the measurement wavelength range Δλges.

One embodiment provides that the quality parameters Q(tj) of the measurement spectra A(tj) in each case be determined as or based upon a single characteristic value Kn:=K0. The reference Aref:=Aref(λ) is preferably a reference spectrum Aref(λ) drawn as a dashed line in FIG. 1, whose spectral values aref(λi) have the characteristic profile. A spectrum recorded with the spectrometric sensor 1 during disturbance-free measurement operation, e.g., as part of commissioning or as part of a calibration procedure, is suitable as a reference spectrum Aref(λ). With such variant, the single characteristic value K0 is determined as an integral, as a sum, as a weighted sum, or as a weighted or unweighted sum of powers of the differences a(λi)−aref(λi) of the spectral values a(λi) of the respective measurement spectrum A(tj) and the spectral values aref(λi) of the reference spectrum Aref(λ) in the range Δλ0, specified for the single characteristic value K0, of the measurement wavelength range Δλges. As a specified range Δλ0, for example, a subrange of the measurement wavelength range Δλges in which disturbances cause changes of the spectral values a(λi) of the measurement spectra A(tj) is suitable here. Alternatively, the range Δλ0 specified for the single characteristic value K0 may also be equal to the entire measurement wavelength range Δλges. Irrespective of the selection of the specified range Δλ0, the quality parameters Q(tj) of the measurement spectra A(tj) with such variant are determined in each case according to, for example:

$$Q(tj) := K0 = \sum_i (a(\lambda_i) - a_{ref}(\lambda_i))^{E_{\lambda_i}} \cdot F_{\lambda_i} \tag{1}$$

where $F_{\lambda_i}$ designates the weighting factors with which the given powers of the individual differences corresponding to the exponents Eλi are included in the sum.

Preferably, the weighting factors Fλi and the exponents Eλi are all set equal to 1, for example. In this case, the quality parameter Q(tj) of each measurement spectrum A(tj) corresponds to the area enclosed in the specified range Δλ0 between the respective measurement spectrum A(tj) and the reference spectrum Aref(λ). Such variant offers the advantage that it may be used immediately in different applications without prior knowledge and without data analysis.

Alternatively, based upon training data comprising measurement spectra A(tj) recorded during disturbance-free operation and measurement spectra A(tj) recorded when disturbances occur, those values of the weighting factors Fλi and/or the exponents Eλi for which the differences between the quality parameters Q(tj) of the measurement spectra A(tj) recorded when disturbances occur and the quality parameters Q(tj) of the measurement spectra A(tj) recorded during disturbance-free operation are as large as possible, larger than a specified threshold value, or even maximum, may be determined numerically and subsequently used. For example, mathematical data evaluation procedures, such as principal component analyses and/or data reduction procedures, may be used for numerical determination.

Alternatively, the quality parameters Q(tj) of the measurement spectra A(tj) in each case may be calculated from or as a function Q(tj):=f(Kn) of two or more different characteristic values Kn. A currently particularly preferred embodiment consists in determining the quality parameters Q(tj) of the measurement spectra A(tj) based upon two different characteristic values Kn:=(K1, K2) of the respective measurement spectrum A(tj). Using the first characteristic value K1, the profile of the spectral values a(λi) of the measurement spectra A(tj) related to the reference Aref is summarily recorded in the first range Δλ1 specified for the first characteristic value K1. Using the second characteristic value K2, the profile of the spectral values a(λi) of the measurement spectra A(tj) related to the reference Aref is summarily recorded in the second range Δλ2, specified for the second characteristic value K2, of the measurement wavelength range Δλges. With this variant, the first range Δλ1 and the second range Δλ2 are preferably two different subranges of the measurement wavelength range Δλges. A constant reference value aref, such as a constant intensity or absorption value of zero, which is identical for all wavelengths λi and is also drawn as an alternative in FIG. 3, is preferably used as the reference Aref for the calculation of both characteristic values K1, K2. With such variant, the quality parameter Q(tj) of each measurement spectrum A(tj) is determined, for example, based upon the difference K2−K1 of the two characteristic values K1, K2 of the respective measurement spectrum A(tj). For example, the procedure is such that each quality parameter Q(tj) in each case is determined as a difference, normalized to the sum of the two characteristic values K1, K2, between the two characteristic values K1, K2. In this case:

$$Q(t_j) := \frac{K1 - K2}{K1 + K2} \tag{2}$$

With such variant, the first range Δλ1 and the second range Δλ2 are preferably specified in such a manner that any disturbances that occur cause changes in the quality parameters Q(tj) that are genuinely greater than fluctuations in the quality parameters Q(tj) of the measurement spectra A(tj) that occur during disturbance-free measurement operation.

As shown, among other things, by the measurement spectra A1, A2 shown by way of example in FIG. 3, in conjunction with spectrometric sensors 1, which determine the measurement spectra A(tj) in a measurement wavelength range Δλges comprising wavelengths in the ultraviolet and in the visual range, the first range Δλ1 is suitable in particular for a subrange comprising wavelengths lying in the ultraviolet range, and the second range Δλ2 is suitable in particular for a subrange comprising wavelengths lying in the visual range. Such selection of the two ranges Δλ1, Δλ2 offers the advantage that it can be made without detailed analysis of measurement spectra A(tj) recorded in the respective application, and thereby highly reliable monitoring results U are obtained in a large variety of different applications.

Alternatively, the two ranges Δλ1, Δλ2 may also be defined based upon a visual comparison of measurement spectra A(tj) recorded during disturbance-free operation and measurement spectra A(tj) recorded when disturbances occur. Preferably, two different subranges of the measurement wavelength range Δλges are selected as the ranges Δλ1, Δλ2, in which the areas enclosed in the two ranges Δλ1, Δλ2 under the measurement spectra A(tj) change in different ways due to the disturbances.

A further alternative consists in numerically determining and subsequently using those two ranges Δλ1, Δλ2 based upon training data for which the differences between the quality parameters Q(tj) of the measurement spectra A(tj) recorded when disturbances occur and the quality parameters Q(tj) of the measurement spectra A(tj) recorded during disturbance-free operation are as large as possible, larger than a specified threshold value, or even maximum. Here as well, the training data comprise measurement spectra A(tj) recorded during disturbance-free operation and measurement spectra A(tj) recorded when disturbances occur.

Irrespective of the manner in which the two ranges Δλ1, Δλ2 are determined, the characteristic values K1, K2 with such variant, for example, are determined in each case as an integral, for example, according to:

$$K1 := \int_{\Delta\lambda 1} (a(\lambda) - a_{ref})d\lambda;\ K2 := \int_{\Delta\lambda 2} (a(\lambda) - a_{ref})d\lambda \qquad (3)$$

or as a sum, for example, according to:

$$K1 = \sum_{i\varepsilon\Delta\lambda 1} (a(\lambda_i) - a_{ref});\ K2 = \sum_{i\varepsilon\Delta\lambda 2} (a(\lambda_i) - a_{ref}) \qquad (4)$$

of the differences a(λi)−aref between the spectral values a(λi) of the respective measurement spectrum A(tj) and the constant reference value aref in the range Δλ1, Δλ2, specified for the respective characteristic value K1, K2, of the measurement wavelength range Δλges. In this case, each characteristic value K1, K2 corresponds in each case to the area enclosed in the range Δλ1, Δλ2 specified for it among the spectral values a(λi) of the respective measurement spectrum A(tj). Such calculation of the two characteristic values K1, K2 offers the advantage that it can be carried out without detailed analysis of measurement spectra A(tj) recorded in the respective application, and thereby highly reliable monitoring results U are obtained in a large variety of different applications.

Alternatively, the two characteristic values K1, K2 can also be determined as a weighted sum or as a weighted or unweighted sum of powers of the differences a(λi)−aref of the spectral values a(λi) of the respective measurement spectrum A(tj) and the constant reference value aref in the range Δλ1, Δλ2, specified for the respective characteristic value K1, K2, of the measurement wavelength range Δλges. In this case, their calculation may be done, for example, analogously to the above equation (1), according to:

$$K1 := \sum_{i\varepsilon\Delta\lambda 1} (a(\lambda_i) - a_{ref})^{E_{\lambda_i}} \cdot F_{\lambda_i};$$

$$K2 := \sum_{i\varepsilon\Delta\lambda 2} (a(\lambda_i) - a_{ref}(\lambda_i))^{E_{\lambda_i}} \cdot F_{\lambda_i}. \qquad (4)$$

Here as well, those values of the weighting factors Fλi and/or of the exponents Eλi for which the differences between the quality parameters Q(tj) of the measurement spectra A(tj) recorded when disturbances occur and the quality parameters Q(tj) of the measurement spectra A(tj) recorded during disturbance-free operation are as large as possible, larger than a specified threshold value, or even maximum are determined numerically, e.g., in the manner described above, based upon training data, and subsequently used.

Figure 4:
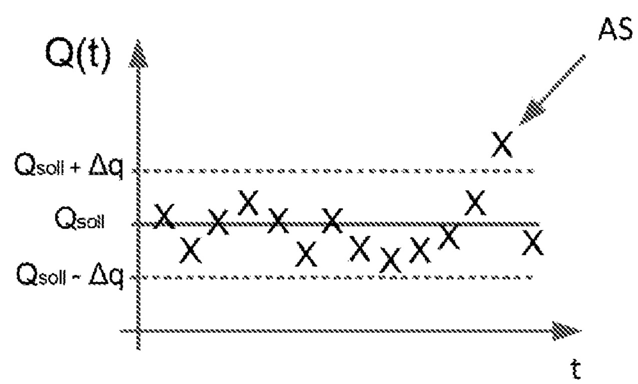

As mentioned above, in the second procedure step V2, any outliers AS that may be contained in the measurement spectra A(tj) are identified based upon the quality parameters Q(tj) determined in the first procedure step V1. The identification can be done, for example, directly based upon the quality parameters Q(tj). As shown in FIG. 4 using the example of a time series of quality parameters Q(tj) of measurement spectra A(tj) determined successively in time, for example, the procedure is such that those measurement spectra A(tj) whose quality parameters Q(tj) deviate by more than a specified tolerance +/−Δq from a specified target value Qsoll are identified as outliers AS. A suitable target value Qsoll is, for example, an average of quality parameters Q(tj) of measurement spectra A(tj) determined in an initialization period or an average of a number of quality parameters Q(tj) of successively determined measurement spectra A(tj) exceeding a specified minimum number.

Alternatively, the identification of the outliers AS is carried out based upon the quality parameters Q(tj) taking into account a temporal development of the quality parameters Q(tj) of the measurement spectra A(tj) recorded successively in time. This takes advantage of the fact that temporal changes of successively determined measurement spectra A(tj) caused by disturbances, such as air bubbles, particles, or impurities, usually occur suddenly and are of short duration. In comparison, during disturbance-free measurement operation, measurement spectra A(tj) that are determined successively change much more continuously and slowly in terms of time. Accordingly, taking into account the temporal development offers the advantage of allowing a more accurate distinction between the measurement spectra A(tj) impaired by disturbances and those recorded during disturbance-free operation.

Figure 5:
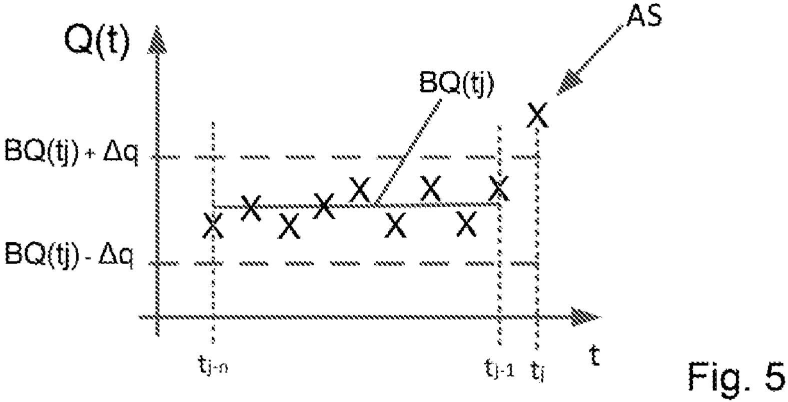

An exemplary embodiment in this regard is shown in FIG. 5 using the example of a time series of quality parameters Q(tj) of measurement spectra A(tj) determined successively in time. Here, those measurement spectra A(tj) whose quality parameter Q(tj) deviates by more than a specified tolerance +/−Δq from a reference value BQ(tj) determined based upon the quality parameters Q(tj−n), . . . , Q(tj−1) of a specified number n of measurement spectra A(tj−n), . . . , A(tj−1) determined prior to the respective measurement spectrum A(tj) are identified as outliers AS. An average or a median of the quality parameters Q(tj−n), . . . , Q(tj−1) of the specified number n of measurement spectra A(tj−n), . . . , A(tj−1) determined prior to the respective measurement spectrum A(tj) is, in particular, suitable as the reference value BQ(tj).

A further exemplary embodiment in this regard is shown in FIG. 6 using the example of a time series of quality parameters Q(tj) of measurement spectra A(tj) determined successively in time shown in subfigure a) of FIG. 6. With such variant, the quality parameters Q(tj) of the measurement spectra A(tj) determined successively in time are filtered by means of a filter, such as a smoothing filter, a moving average filter, a moving median filter, or an exponential filter. The resulting filtered quality parameters fq(tj) are shown in subfigure a) of FIG. 6 in the form of a dashed line fq(t) representing the time course of the filtered quality parameters fq(tj). In addition, a deviation value P(tj) is determined in each case for each measurement spectrum A(tj), for example, according to: P(tj):=I Q(tj)−fq(tj) I, which corresponds to the amount of a difference between the quality parameter Q(tj) of the respective measurement spectrum A(tj) and the associated filtered quality parameter fq(tj). The resulting time series of deviation values P(tj) is shown in subfigure b) of FIG. 6. In the example shown in FIG. 6, any outliers AS that may be contained in the measurement spectra A(tj) are determined directly based upon the deviation values P(tj). For example, the procedure is such that those measurement spectra A(tj) whose deviation value P(tj) exceeds a specified threshold value Pref are identified as outliers AS.

Alternatively, the identification of the outliers AS is carried out based upon the deviation values P(tj), taking into account a temporal development of the deviation values P(tj) of the measurement spectra A(tj) recorded successively in time.

An exemplary embodiment in this regard is shown in FIG. 7 using the example of a time series of deviation values P(tj−n), . . . , P(tj) of measurement spectra A(tj−n), . . . , A(tj) determined successively in time. Here, those measurement spectra A(tj) whose deviation value P(tj) deviates by more than a specified tolerance +/−Δp from a reference value BP(tj) determined based upon the deviation values P(tj−n), . . . , P(tj−1) of a specified number n of measurement spectra A(tj−n), . . . , A(tj−1) determined prior to the respective measurement spectrum A(tj) are identified as outliers AS. An average or a median of the deviation values P(tj−n), . . . , P(tj−1) of the specified number n of measurement spectra A(tj−n), . . . , A(tj−1) determined prior to the respective measurement spectrum A(tj) is, in particular, suitable as the reference value BP(tj).

A further exemplary embodiment is shown in FIG. 8 using the example of a time series of deviation values P(tj) of measurement spectra A(tj) determined successively in time. With such variant, the deviation values P(tj) of the successively recorded measurement spectra A(tj) are filtered by means of a filter, such as a smoothing filter, a moving average filter, a moving median filter, or an exponential filter. The resulting filtered deviation values fp(tj) are shown in FIG. 8 in the form of a solid line fp(t) representing the time course of the filtered deviation values fp(tj). With such variant, those measurement spectra A(tj) whose deviation value P(tj) deviates from the associated filtered deviation value fp(tj) by more than a specified tolerance +/−Δp are identified as outliers AS.

As previously mentioned, in the third procedure step V3, the monitoring result U is determined based upon the measurement spectra A(tj) identified as outliers AS and made available, for example, output, displayed, and/or made available in readable or retrievable form. For example, the procedure is such that a message, a warning, or an alarm is output, displayed, and/or made available if one of the measurement spectra A(tj) has been identified as an outlier AS. Alternatively or in addition thereto, for example, information about each measurement spectrum A(tj) identified as an outlier AS is output, displayed, and/or made available, and/or information about whether or not the respective measurement spectrum A(tj) has been identified as an outlier AS is output, displayed, and/or made available for each measurement spectrum A(tj).

The monitoring procedure has the advantages mentioned above. Optionally, individual procedure steps can each have different embodiments that can be used individually and/or in combination with one another. Some embodiments that are currently particularly preferred are described below.

For example, the monitoring procedure may thus be used to monitor whether unusual conditions occur at the point of use of the spectrometric sensor 1, in particular unusual conditions that cause the spectral values a(λi) of the measurement spectra A(tj) to deviate from the profile characteristic of the respective application. These include, for example, in particular conditions that change the composition and/or properties of the medium 5. If one considers a sewage treatment plant as an example, such a condition can be caused, for example, by a heavy rain, by damage to a filter, or by a process that is faulty, incomplete, or not carried out at all at the point of use. Compared to the previously described disturbances, such as air bubbles, which typically occur only for very short periods of time, such conditions are usually of longer duration. Accordingly, for the detection of unusual conditions, the procedure is for example such that an unusual condition is detected if more than a specified number k of measurement spectra A(tj) determined within a moving time window of specified duration have been identified as outliers AS. In addition, a status message E, such as a message, warning, or alarm is output, displayed, and/or otherwise made available if an unusual condition has been detected. Condition detection is carried out, for example, as part of the determination of the monitoring result U. Alternatively or in addition thereto, the associated status messages E are output, displayed, and/or made available, for example, as a component of the monitoring result U.

A further optional embodiment consists in monitoring whether the medium 5 has a specific color. A color value F of the medium 5 is determined for at least one of the measurement spectra A(tj), for measurement spectra A(tj) determined successively at time intervals, or for each measurement spectrum A(tj), in each case based upon the sum or the integral of the spectral values a(λi) of the respective measurement spectrum A(tj) over a color spectral range Δλf, corresponding to the color, of the measurement wavelength spectrum Δλges. As an example, FIG. 3 shows a color value F of the first measurement spectrum A1, which corresponds to the area enclosed in the color spectral range Δλf under the measurement spectrum A1. In this embodiment, the monitoring result U comprises, for example, a component corresponding to the color value F, such as the color value F itself and/or information, determined based upon the color value F, about whether or not the medium 5 has the color, which is output, displayed, and/or otherwise made available.

A further optional embodiment consists in monitoring, for at least one specified spectral range Δλs of the measurement wavelength range Δλges, whether optical saturation of the spectrometric sensor 1 has occurred in the respective spectral range Δλs. In conjunction with measurement spectra A(tj) in the form of absorption spectra, optical saturation occurs if the absorption occurring along the optical path 11 exceeds an upper limit value amax for absorption values that can be recorded metrologically, shown in FIG. 3, above which further additional absorption no longer results in an increase that can be resolved metrologically in the measured absorption value. In conjunction with measurement spectra A(tj) designed as intensity spectra, optical saturation occurs if the intensity of the measurement radiation S becomes so low that the intensity values fall below a lower limit value amin for intensity values that can be recorded metrologically, below which a further decrease in intensity going beyond this no longer causes a reduction that can be resolved metrologically in the measured intensity value. In both cases, the respective limit value amax or amin is in each case a constant or even wavelength-dependent property of the spectrometric sensor 1, which can be measured experimentally or determined numerically in each case for spectrometric sensors of the most varied types.

The monitoring of saturation takes place for the or each spectral range Δλs, in which, for at least one of the measurement spectra A(tj), for measurement spectra (A(tj)) determined successively at time intervals, or for each measurement spectrum A(tj), it is checked in each case whether optical saturation has occurred in the respective spectral range Δλs, and a saturation message OS, a warning, or an alarm is displayed, output, and/or otherwise made available if it has been ascertained that optical saturation has occurred. In conjunction with measurement spectra A(tj) designed as intensity spectra, for example, the procedure is such that the occurrence of optical saturation is ascertained if at least one or the smallest of the spectral values a(λi) of the respective measurement spectrum A(tj) lying in the spectral range Δλs falls below the lower limit value amin. Analogously, in conjunction with measurement spectra A(tj) designed as absorption spectra, for example, the procedure is such that the occurrence of optical saturation is ascertained if at least one or the largest of the spectral values a(λi) of the respective measurement spectrum A(tj) lying in the spectral range Δλs exceeds the upper limit value amax.

The monitoring procedure is designed, for example, as a computer-implemented procedure. In this respect, the present disclosure also comprises a computer program for monitoring the quality of measurement spectra A(tj) of a liquid medium 5 continuously determined by a spectrometric sensor 1, comprising computer-readable program code elements that, if executed on a computer, cause the computer to execute the monitoring procedure described above based upon the measurement spectra A(tj) determined by the spectrometric sensor 1. Furthermore, the present disclosure comprises a computer program product having at least one computer-readable medium, on which at least the computer program is stored.

Figure 9:
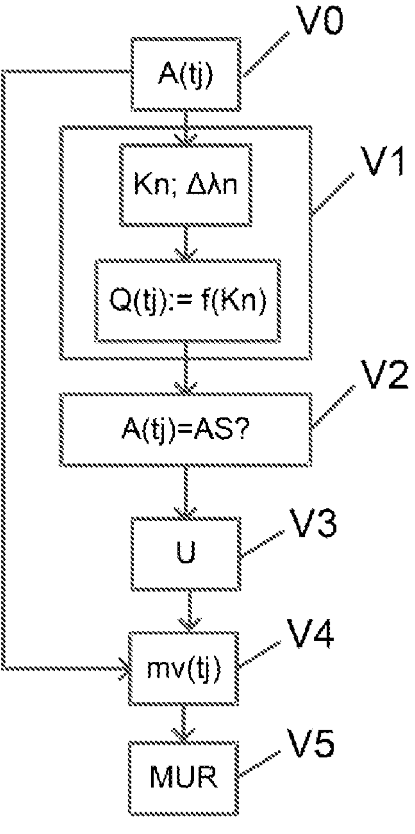
FIG. 9 shows a flowchart of a measuring procedure.

The monitoring procedure can be used in isolation to monitor only the quality of the measurement spectra A(tj). Alternatively, the monitoring procedure is used, for example, in a measuring procedure shown in FIG. 9 for measuring at least one measured variable of a liquid medium 5. Such measuring procedure comprises a procedure step V0 with which measuring radiation S is received by means of the spectrometric sensor 1, and the spectrometric sensor 1 continuously determines and makes available measurement spectra A(tj) of the measuring radiation S. In addition, the measuring procedure comprises the procedure steps V1, V2, and V3, carried out based upon the measurement spectra A(tj), of the monitoring procedure, a procedure step V4, in which measured values mv(tj) of the respective measured variable are determined based upon the measurement spectra A(tj), and a procedure step V5, in which a measurement and monitoring result MUR is determined based upon the monitoring result U and the measured values m(tj) and is output, displayed, and/or made available.

The determination of the measured values mv(tj) carried out in procedure step V4 is carried out, depending upon the measured variable, for example, in one of the ways listed in the introduction to the description and known from the prior art.

The measurement and monitoring result MUR may be determined and made available in different ways depending upon the design of the measuring procedure. For example, the measured values m(tj) may be determined independently of the monitoring result U. In this case, the measurement and monitoring result MUR comprises the measured values mv(tj) and the monitoring result U determined in parallel thereto. The procedure is, for example, such that the measurement and monitoring result MUR contains information for each measured value mv(tj) as to whether the measured value mv(tj) was determined on the basis of a measurement spectrum A(tj) identified as an outlier AS.

Alternatively, the measured values m(tj) may also be determined taking into account the monitoring result U. An embodiment for this purpose provides that measurement spectra A(tj) identified as outliers AS by means of the monitoring procedure be discarded, and measured values mv(tj) of the measured variable determined exclusively based upon the measurement spectra A(tj) remaining after the discarding of the measurement spectra A(tj) identified as outliers AS be output, displayed, and/or otherwise made available. A result that is the same with respect to the measured values mv(tj) contained in the measurement and monitoring result MUR may alternatively be achieved by determining the associated measured value mv(tj) in each case based upon each measurement spectrum A(tj), and subsequently discarding those measured values mv(tj) which have been determined on the basis of measurement spectra A(tj) identified as outliers AS. In both cases, it is already sufficient if the measurement and monitoring result MUR comprises only the measured values m(tj) determined from measurement spectra A(tj) not identified as outliers AS. Optionally, however, the measurement and monitoring result MUR may also here additionally comprise the monitoring result U or at least a component of the monitoring result U.

Irrespective of whether the measured values mv(tj) contained in the measurement and monitoring result MUR are determined with or without taking into account the monitoring result U, the monitoring result U and thus also measurement and monitoring result MUR may contain at least one of the further components described above, such as status messages E on unusual conditions detected by means of the monitoring procedure, the color value F of the medium 5, the information, determined based upon the color value F, on whether or not the medium 5 has the color, and/or saturation messages OS on optical saturations detected by means of the monitoring procedure in at least one spectral range Δλs.

Furthermore, the present disclosure comprises a measuring device, such as the measuring device shown in FIG. 1, which is designed to carry out the measuring procedure described above. For this purpose, the measuring device comprises the spectrometric sensor 1. It is already sufficient if the spectrometric sensor 1 comprises at least the spectrometric unit 7, which receives the measurement radiation S resulting from the interaction with the medium 5 and continuously determines and makes available the measurement spectra A(tj) based upon the measurement radiation S. A monitoring device 15 is connected to the spectrometric unit 7 and carries out the monitoring procedure described above based upon the measurement spectra A(tj). Furthermore, the measuring device comprises an evaluation device 17 which is connected to the spectrometric unit 7 and/or the monitoring device 15 and determines the measured values mv(tj) of the measured variable based upon the measurement spectra A(tj), and an output device 19, which outputs, displays, and/or makes available the measurement and monitoring result MUR.

In the example shown in FIG. 1, the monitoring device 15, the evaluation device 17, and the output device 19 are arranged in a device 21 connected to the spectrometric sensor 1, such as a transmitter or a measuring transducer. Alternatively, however, the measuring device can also be designed as a spectrometric sensor 1' shown as an alternative in dashed lines in FIG. 1, which comprises the monitoring device 15, the evaluation device 17, and the output device 19.

With measuring devices with which the measured values mv(tj) contained in the measuring and monitoring result MUR are determined by means of the evaluation device 17 taking into account the monitoring result U, the evaluation device 17 is connected on the input side to the monitoring device 15 and on the output side to the output device 19. With measuring devices with which the measured values mv(tj) are determined by means of the evaluation device 17 without taking into account the monitoring result U, the monitoring device 15 and the evaluation device 17 may, for example, in each case be connected on the input side to the spectrometric unit 7 and on the output side to the output device 19.

Irrespective of whether or not the monitoring result U is taken into account in determining the measured values m(tj)

contained in the measurement and monitoring result MUR, the output device 19 comprises, for example, at least one interface 23 via which at least one component of the measurement and monitoring result MUR is output and/or made available in each case. The measured values mv(tj) and/or components of the monitoring result U may, for example, in each case be read out in the form of data or signals via the interface 23 in a wireless or wired manner, output, and/or transmitted to a unit that is superordinate to the measuring device, such as a control room, a process controller, a control system, or a programmable logic controller. Alternatively or in addition thereto, the output device 19 comprises, for example, a display device 25 for displaying at least one component of the measurement and monitoring result MUR. As shown in FIG. 1, the display device 25 comprises, for example, a display 27 for displaying the measured values mv(tj). Alternatively or in addition thereto, the display device 25 comprises, for example, at least one display element, such as a light-emitting diode, a color-coded light-emitting diode, or a display, for displaying at least one component of the monitoring result U.

One embodiment provides that, via the interface 23 and/or via the display device 25, for each measured value mv(tj) determined without taking into account the monitoring result U, information is output, displayed, and/or made available in each case as to whether the respective measured value mv(tj) was determined on the basis of a measurement spectrum A(tj) identified as an outlier AS.

The display device 25 shown as an example in FIG. 1 comprises a display element 29, such as, for example, a light-emitting diode, which displays if a measurement spectrum A(tj) has been identified as an outlier AS. For this purpose, the display element 29 may light up, for example, if a measurement spectrum A(tj) has been identified as an outlier AS. Alternatively, the display element 29 is designed, for example, as a color-coded display element, whose color displays whether or not the current measured value mv(tj) was determined on the basis of a measurement spectrum A(tj) identified as an outlier AS. As shown in FIG. 1, such display element 29 is preferably arranged in the vicinity of, for example, above, below, or next to, the display 27 displaying the measured values mv(tj).

Alternatively or in addition thereto, the display device 25 comprises, for example, at least one display element 31, such as a light-emitting diode, for displaying optical saturations ascertained by means of the monitoring procedure, a display element 33, such as a light-emitting diode, for displaying unusual conditions E detected by means of the monitoring procedure, and/or a display element 35, which displays the color value F determined by means of the monitoring procedure and/or the information, determined based upon the color value F, about whether or not the medium 5 has the color.

Depending upon the embodiment of the measuring device, each interface 23, the display 27, and/or each display element 29, 31, 33, 35 of the display device 25 is arranged, for example, either on the spectrometric sensor 1, 1' or on the device 21.

The invention claimed is:

1. A method of measuring at least one measured variable of a liquid medium, comprising:

continuously determining measurement spectra of the liquid medium, using a spectrometric sensor, each reproducing spectral values of measurement radiation received by the spectrometric sensor and resulting from an interaction with the medium in a specified measurement wavelength range for each measurement spectrum, determining a quality parameter of the respective measurement spectrum based on characteristic values, wherein each characteristic value is determined as an integral, as a sum, as a weighted sum, or as a weighted or unweighted sum of powers of the spectral values of the respective measurement spectrum in relation to a specified reference in a range of the measurement wavelength range specified for the respective characteristic value;

wherein the characteristic values comprise a first characteristic value and a second characteristic value, wherein the range specified for the first characteristic value is a first subrange of the measurement wavelength range, and the range specified for the second characteristic value is a second subrange of the measurement wavelength range different from the first subrange;

based on the quality parameters of the measurement spectra, identifying those measurement spectra which have impaired spectral values due to a disturbance occurring during their determination and impairing the quality parameter as outliers determining a monitoring result based upon the measurement spectra that are identified as outliers determining measured values of the respective measured variable based on the measurement spectra; and determining and providing a measurement and monitoring result based upon the measured values and the monitoring result;

wherein the quality parameters of each measurement spectrum are determined based upon a difference between the first characteristic value and the second characteristic value of the respective measurement spectrum or based upon a difference between the first characteristic value and the second characteristic value of the respective measurement spectrum, normalized to a sum of the two characteristic values; and wherein the reference is either a constant reference value identical for all wavelengths or a reference value of zero.

2. The method according to claim 1, wherein:

the range specified for the first characteristic value comprises wavelengths in an ultraviolet range, and the range specified for the second characteristic value comprises wavelengths in a visual range of the measurement wavelength range and/or the range specified for the first characteristic value and the range specified for the second characteristic value are determined based on a visual comparison of measurement spectra recorded during disturbance-free operation and measurement spectra recorded when disturbances occur, such that the areas enclosed in the two ranges under the measurement spectra change in a different manner due to disturbances or numerically based upon training data comprising measurement spectra recorded during disturbance-free operation and measurement spectra recorded when disturbances occur, such that the differences between the quality parameters of the measurement spectra recorded when disturbances occur and the quality parameters of the measurement spectra recorded during disturbance-free operation are as large as possible.

3. The method of claim 1, wherein at least one of the characteristic values is determined as a weighted sum or as a weighted or unweighted sum of powers of the spectral values of the respective measurement spectrum in relation to the specified reference, and weighting factors and/or exponents, corresponding to the powers, used for calculating the respective characteristic value are determined based upon training data comprising measurement spectra recorded during disturbance-free operation and measurement spectra recorded when disturbances occur, such that the differences between the quality parameters of the measurement spectra recorded when disturbances occur and the quality parameters of the measurement spectra recorded during disturbance-free operation are as large as possible, larger than a specified threshold value, or even maximum.

4. The method according to claim 1, wherein:

those measurement spectra whose quality parameter deviates from a specified target value by more than the specified tolerance are identified as outliers, or the identification of the outliers is carried out based upon the quality parameters of the measurement spectra, taking into account a temporal development of the quality parameters of the measurement spectra recorded successively in time, or those measurement spectra whose quality parameter deviates by more than a specified tolerance from a reference value determined based upon a specified number of measurement spectra determined prior to the respective measurement spectrum, in particular, their average or median, are identified as outliers.

5. The method according to claim 1, comprising:

with a filter, a smoothing filter, a moving average filter, a moving median filter, or an exponential filter, filtering the quality parameters of the measurement spectra determined successively in time based upon the quality parameters and the associated filtered quality parameters, for each measurement spectrum, determining a deviation value, which corresponds to an amount of a difference between the quality parameter of the respective measurement spectrum and the associated filtered quality parameter, and identifying the outliers based upon the deviation values in that:

identifying those measurement spectra as outliers whose deviation value exceeds a specified threshold value, or identifying the outliers based upon the deviation values, taking into account a temporal development of the deviation values of the measurement spectra recorded successively in time, or identifying those measurement spectra as outliers for which the deviation value deviates by more than a specified tolerance from a reference value determined based upon the deviation values of a specified number of measurement spectra determined prior to the respective measurement spectrum, in particular, their average or median, are identified as outliers, or with a filter, a smoothing filter, a moving average filter, a moving median filter, or an exponential filter, filtering the deviation values of the successively recorded measurement spectra and identifying those measurement spectra as outliers for which the deviation value deviates from the associated filtered deviation value by more than a specified tolerance.

6. The method according to claim 1, further comprising detecting an unusual condition, in particular, an unusual condition occurring at the point of use of the spectrometric sensor, which causes the spectral values of the measurement spectra to deviate from a profile characteristic of the respective application, and outputting displaying, and/or providing a status message, a message, a warning, or an alarm if more than a specified number of measurement spectra determined within a moving time window of specified duration are identified as outliers.

7. The method according to claim 1, comprising monitoring whether the medium has a specific color, by:

determining a color value of the medium for at least one of the measurement spectra, for measurement spectra determined successively at time intervals, or for each measurement spectrum, in each case based upon the sum or the integral of the spectral values of the respective measurement spectrum over a spectral range of the measurement wavelength range corresponding to the color and outputting displaying and/or providing the color value and/or information determined based upon the color value about whether the medium has the color.

8. The method according to claim 1, further comprising, for at least one specified spectral range of the measurement wavelength range, monitoring whether optical saturation of the spectrometric sensor has occurred in the respective spectral range by checking, for at least one of the measurement spectra, for measurement spectra determined successively at time intervals, or for each measurement spectrum, in each case whether optical saturation has occurred in the respective spectral range, wherein the procedure is in particular such that the occurrence of the optical saturation:

in conjunction with measurement spectra formed as intensity spectra, is ascertained if at least one or the smallest of the spectral values of the respective measurement spectrum lying in the spectral range falls below a lower, constant, or wavelength-dependent limit value, and, in conjunction with measurement spectra formed as absorption spectra, is ascertained if at least one or the largest of the spectral values of the respective measurement spectrum lying in the spectral range exceeds an upper, constant, or wavelength-dependent limit value, and a saturation message, a warning, or an alarm is displayed, output, and/or made available if it has been ascertained that optical saturation has occurred in the respective spectral range.

9. The method according to claim 1, further comprising outputting displaying and/or providing at least one of:

a message, warming, or alarm if any of the measurement spectra have been identified as outliers, information about each measurement spectrum identified as an outlier, and an information for each measurement spectrum, as to whether or not the respective measurement spectrum has been identified as an outlier.

10. The method according to claim 1, wherein:

the measurement and monitoring result:

comprises measured values of the measured variable, comprises measured values of the measured variable and the monitoring result, and/or comprises measured values of the measured variable and at least one component of the monitoring result, unusual conditions detected by means of the monitoring procedure, the color value of the medium, the information, determined based upon the color value, about whether or not the medium has the color, and/or optical saturations detected by means of the monitoring procedure in at least one spectral range, and/or the measured values:

are determined independently of the monitoring result, and the measurement and monitoring result for each measured value contains information about whether the measured value was determined based upon a measurement spectrum identified as an outlier, or are determined in that:

measurement spectra identified as outliers based upon the monitoring result are discarded, and the measured values are determined based upon the measurement spectra remaining after the discarding of the outliers and are output, displayed, and/or made available, or the associated measured value is determined based upon each measurement spectrum, and-measured values determined based on measurement spectra identified as outliers are discarded, and the measured values remaining after discarding such measured values are output, displayed, and/or made available.

11. A measuring device configured to perform the method according to claim 1, comprising:

a spectrometric sensor, wherein the spectrometric sensor comprises a spectrometric unit configured to receive measurement radiation resulting from an interaction with the medium and to continuously determine and make available measurement spectra based upon the received measurement radiation, a monitoring device connected to the spectrometric unit and configured to determine a quality parameter for each measurement spectrum based on characteristic values, wherein each characteristic value is determined as an integral, as a sum, as a weighted sum, or as a weighted or unweighted sum of powers of the spectral values of the respective measurement spectrum in relation to a specified reference in a range of the measurement wavelength range specified for the respective characteristic value, and the characteristic values comprise a first characteristic value and a second characteristic value, wherein the range specified for the first characteristic value is a first subrange of the measurement wavelength range, and the range specified for the second characteristic value is a second subrange of the measurement wavelength range different from the first subrange, based upon the quality parameters of the measurement spectra identify those measurement spectra which have impaired spectral values due to a disturbance occurring during their determination and impairing the quality parameter as outliers, and determine a monitoring result based upon the measurement spectra that are identified as outliers, and an evaluation device connected to the spectrometer and/or the monitoring device and configured to determine a measurement result by determining measured values of the respective measured variable based upon the measurement spectra, and an output device configured to output, display, and/or make available the measurement and monitoring result.

12. The measuring device according to claim 11, wherein the output device:

comprises an interface and/or a display device via which, for each measured value determined without taking into account the monitoring result, information is output, displayed, and/or made available in each case as to whether the respective measured value was determined based upon a measurement spectrum identified as an outlier, comprises at least one interface and/or one display device, via which in each case at least one component of the measurement and monitoring result, in particular the measured values and/or at least one component of the monitoring result, is output, displayed, and/or made available, and/or comprises a display device that:

comprises a display for displaying the measured values, has a display element or a display element designed as a light-emitting diode, which displays or lights up if a measurement spectrum has been identified as an outlier, has a display element designed as a color-coded display element, whose color displays whether or not the current measured value was determined based upon a measurement spectrum identified as an outlier, comprises at least one display element or a display element designed as a light-emitting diode for displaying optical saturations ascertained by means of the monitoring procedure, comprises a display element or a display element designed as a light-emitting diode for displaying unusual conditions detected by means of the monitoring procedure, and/or comprises a display element that displays the color value determined by means of the monitoring procedure and/or the information, determined based upon the color value, about whether or not the medium has the color.

13. A computer program product comprising a non-transitory computer-readable medium, and a computer program stored on the non-transitory computer-readable medium comprising instructions which, when the program is executed by a computer, cause the computer to:

continuously determining measurement spectra of the liquid medium, using a spectrometric sensor, each reproducing spectral values of measurement radiation received by the spectrometric sensor and resulting from an interaction with the medium in a specified measurement wavelength range;

for each measurement spectrum determining a quality parameter of the respective measurement spectrum based on characteristic values;

wherein each characteristic value is determined as an integral, as a sum, as a weighted sum, or as a weighted or unweighted sum of powers of the spectral values of the respective measurement spectrum in relation to a specified reference in a range of the measurement wavelength range specified for the respective characteristic value;

wherein the characteristic values comprise a first characteristic value and a second characteristic value, wherein the range specified for the first characteristic value is a first subrange of the measurement wavelength range, and the range specified for the second characteristic value is a second subrange of the measurement wavelength range different from the first subrange;

based on the quality parameters of the measurement spectra, identifying those measurement spectra which have impaired spectral values due to a disturbance occurring during their determination and impairing the quality parameter as outliers;

determining a monitoring result based upon the measurement spectra that are identified as outliers;

determining measured values of the respective measured variable based on the measurement spectra; and determining and providing a measurement and monitoring result based upon the measured values and the monitoring result;

wherein the quality parameters of each measurement spectrum are determined based upon a difference between the first characteristic value and the second characteristic value of the respective measurement spectrum or based upon a difference between the first characteristic value and the second characteristic value of the respective measurement spectrum, normalized to a sum of the two characteristic values; and wherein the reference is either a constant reference value identical for all wavelengths or a reference value of zero.

* * * * *